United States Patent
Ito et al.

(10) Patent No.: US 12,540,078 B2
(45) Date of Patent: Feb. 3, 2026

(54) MOLDING MATERIAL FOR PRODUCING CARBON CLUSTERS AND A METHOD FOR MANUFACTURING THEREOF

(71) Applicants: MITSUBISHI CORPORATION LIFE SCIENCES LTD., Tokyo (JP); The Honjo Chemical Corporation, Osaka (JP); Nippon Electrode Co., Ltd, Shizuoka (JP)

(72) Inventors: Masayuki Ito, Tokyo (JP); Yuichi Hayashi, Osaka (JP); Hirohisa Hikita, Osaka (JP); Naoki Matsumoto, Shizuoka (JP)

(73) Assignees: MITSUBISHI COPORATION LIFE SCIENCES LTD., Tokyo (JP); NIPPON ELECTRODE CO., LTD., Shizuoka (JP); THE HONJO CHEMICAL CORPORATION, Osaka (JP)

( * ) Notice: Subject to any disclaimer, the term of this patent is extended or adjusted under 35 U.S.C. 154(b) by 737 days.

(21) Appl. No.: 17/438,769

(22) PCT Filed: Mar. 16, 2020

(86) PCT No.: PCT/JP2020/011497
§ 371 (c)(1),
(2) Date: Sep. 13, 2021

(87) PCT Pub. No.: WO2020/189632
PCT Pub. Date: Sep. 24, 2020

(65) Prior Publication Data
US 2022/0162073 A1 May 26, 2022

(30) Foreign Application Priority Data

Mar. 20, 2019 (JP) ................................ 2019-053728

(51) Int. Cl.
*C01B 32/154* (2017.01)
*C01B 32/205* (2017.01)

(52) U.S. Cl.
CPC .......... *C01B 32/154* (2017.08); *C01B 32/205* (2017.08); *C01P 2006/11* (2013.01)

(58) Field of Classification Search
CPC ..... C01B 32/05; C01B 32/152; C01B 32/154; C01B 32/20; C01B 32/205; C01P 2006/11
See application file for complete search history.

(56) References Cited

U.S. PATENT DOCUMENTS

| 2011/0027603 A1* | 2/2011 | Yaniv | ..................... H01L 23/373 |
| | | | 72/46 |
| 2016/0200579 A1* | 7/2016 | Adrianowycz | ....... C04B 35/636 |
| | | | 423/448 |

FOREIGN PATENT DOCUMENTS

| CN | 102060290 | 5/2011 |
| CN | 110342499 | 10/2019 |
| JP | 2000-219506 | 8/2000 |

OTHER PUBLICATIONS

Zhong, B., et al. "Binding natural graphite with mesophase pitch: A promising route to future carbon blocks." Materials Science and Engineering: A 610 (2014): 250-257.*

(Continued)

*Primary Examiner* — Richard M Rump
(74) *Attorney, Agent, or Firm* — Wenderoth, Lind & Ponack, L.L.P.

(57) ABSTRACT

A molding material for producing the carbon clusters using biomass as the main raw material, comprising the biomass and a binder as the derived raw material, wherein the molding material is graphitized, the electrical resistivity of the molding material is equal to or less than 100 μΩm, the diffraction pattern of the molding material by powder X-ray (Continued)

diffraction method has one peak between 2θ (θ is the Bragg angle) of 26 to 27°, and the value of ⅓ width divided by the base of the peak is equal to or less than 0.68. The method for producing the molding material for producing the carbon clusters according to any of claims 1 to 6, comprising following steps of: obtaining a molded precursor containing a calcined biomass and a binder; optionally, further baking the precursor; and graphitizing the precursor at a temperature of 2500° C. or higher.

6 Claims, 1 Drawing Sheet

(56) References Cited

OTHER PUBLICATIONS

Zandersons, J., et al. "Carbon materials obtained from self-binding sugar cane bagasse and deciduous wood residues plastics." Biomass and Bioenergy 26.4 (2004): 345-360.*
Coutinho, A. R., J. D. Rocha, and C. A. Luengo. "Preparing and characterizing biocarbon electrodes." Fuel processing technology 67.2 (2000): 93-102.*
Soleimani, Majid, et al. "Carbohydrates as binders in biomass densification for biochemical and thermochemical processes." Fuel 193 (2017): 134-141.*
International Search Report (ISR) issued Jun. 2, 2020 in International (PCT) Application No. PCT/JP2020/011497.

* cited by examiner

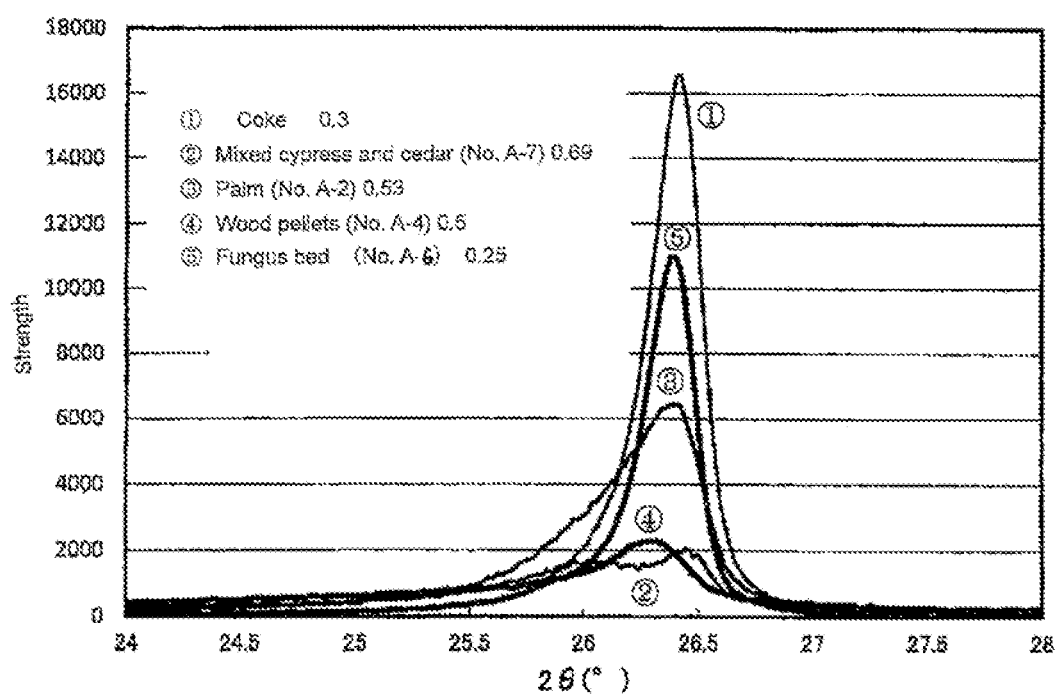

MOLDING MATERIAL FOR PRODUCING CARBON CLUSTERS AND A METHOD FOR MANUFACTURING THEREOF

TECHNICAL FIELD

The present invention is related to a molding material for producing carbon clusters and a method for manufacturing thereof.

BACKGROUND OF ART

Fullerene is an allotrope consisting only of carbon, the same as diamond and graphite, and has traditionally been used in cosmetics and other products.

As a method of producing fullerenes, the arc discharge method, combustion method, and other methods have been put to practical use. As raw materials for these production methods, petroleum- and coal-derived raw materials, such as carbon electrodes and benzene, have been used (Patent Documents 1 and 2).

Petroleum and coal-based materials are finite resources that take an enormous amount of time to generate, and there is a worldwide need to reduce their use.

Carbon electrodes are generally manufactured by mixing coke produced from coal or petroleum with pitch, kneading, molding, firing, and graphitization. The term "graphitization" generally refers to the conversion of non-graphitic carbon into graphitic carbon with a three-dimensional regular structure of graphite by developing its laminated structure mainly through physical changes by heat treatment at about 1,500° C. or higher (non-patent document 1). Coal, which is the raw material for carbon electrodes, is a general term for materials produced by ancient (hundreds of millions of years ago) plants that were buried underground before they completely decayed/decomposed, and were transformed (coalified) there by geothermal heat and pressure for a long period of time. Aromatic compounds such as benzene and toluene, which are materials for combustion methods, are industrially produced from naphtha distilled from petroleum. Petroleum is thought to be a liquid produced by the transformation of dead plankton in ancient times.

On the other hand, in the cosmetics industry, naturally-derived materials have traditionally been preferred by many consumers over petroleum- and coal-derived materials because of their better image.

Carbon electrodes and aromatic compounds have been produced industrially using coal- and petroleum-based raw materials, but there is no known technology for industrially producing carbon materials, the source of carbon electrodes, directly from plants. It has been reported that up to 212 mg of fullerenes can be produced experimentally using chips or granular carbon materials as anode electrodes (Non-Patent Document 2). In that study, a block of charcoal or India ink dried for one hour was made and used. However, it is reported that the maximum amount of fullerene in the soot is 3%, and that there are many impurities other than fullerene in it. In the case of DC arc discharge using a block as an anode, as in non-patent document 2, it is difficult to determine the exact position of the block material, especially when it is replenished. Therefore, it is difficult to obtain a stable discharge continuously, which may result in a large power consumption, and this method has practicality issues. Thus, at present, the technology has not been sufficiently studied to be industrially viable.

CITATION LIST

Patent Document

[Patent document 1] JP3337313
[Patent document 2] JP4786829

Non-Patent Document

[Non-Patent Document 1] "Carbon Terminology Dictionary," edited by the Carbon Terminology Dictionary Editorial Committee of the Carbon Materials Society of Japan (Agune Shofu-sha), pp. 114-115, Oct. 5, 2000, 1st edition, 1st printing.
[Non-Patent Document 2] Synthesis of fullerenes from charcoal, India ink, synthetic rubber, carbon black, and activated carbon using a chip raw material arc synthesizer, Proceedings of the Fullerene Symposium, 1999, 16, pp. 136-141
[Non-patent document 3] https://www.maff.go.jp/kyusyu/kikaku/baiomasu/teigitou.html

SUMMARY OF INVENTION

Technical Problem

The present invention was made in consideration of the circumstances described above. The present invention aims to provide a sustainable, ecological, and industrially applicable molding material for producing carbon clusters and its production method using plant-derived materials instead of conventional petroleum- and coal-derived materials.

Solution to Problem

A molding material for producing the carbon clusters using biomass as the main raw material, comprising the biomass and a binder as the derived raw material,
wherein the molding material is graphitized,
the electrical resistivity of the molding material is equal to or less than 100 μΩm,
the diffraction pattern of the molding material by powder X-ray diffraction method has one peak between 2θ (θ is the Bragg angle) of 26 to 27°, and the value of ⅓ width divided by the base of the peak is equal to or less than 0.68.

The method for producing the molding material for producing the carbon clusters according to any of claims 1 to 6, comprising following steps of:
obtaining a molded precursor containing a calcined biomass and a binder;
optionally, further baking the precursor; and
graphitizing the precursor at a temperature of 2500° C. or higher.

Advantageous Effects of Invention

The molding material for producing carbon clusters is sustainable and ecological because it is made of plant-derived raw materials, and it is suitable for industrial use in carbon cluster production.

BRIEF DESCRIPTION OF DRAWINGS

The graphs show the results of X-ray diffraction for each rod derived from different materials.

DESCRIPTION OF EMBODIMENTS

An embodiment of the invention is described in detail below.

1. Molding Material for Producing Carbon Clusters

The molding material for the production of carbon clusters (hereinafter referred to as the molding material of the present invention) is graphitized using biomass as the main raw material.

The molding material of the present invention is used to produce carbon clusters. Examples of the method for producing carbon clusters include arc discharge with the formed body of the present invention as an electrode, laser evaporation, resistance heating, and high-frequency induction heating. For these specific conditions, etc., reference is made to the conventional techniques using petroleum and coal-derived raw materials.

In the arc discharge, for example, in a non-oxidizing atmosphere using inert gas such as helium gas or argon gas, the molding material of the invention is used as the anode or cathode, and the pressure of the ambient gas is adjusted, and while applying voltage by a power supply, the distance between electrodes is controlled appropriately according to the evaporation of the material, and the output is adjusted to stabilize the discharge at a constant level to obtain soot containing the desired carbon clusters. For example, soot (low soot) containing carbon clusters is deposited on the wall of a closed container. The carbon clusters are separated from this soot by a solvent extraction method, etc.

The shape of the molding material of the present invention is not particularly limited, as long as the shape is suitable for the production of carbon clusters. For example, it can be a single material as an electrode, a prismatic column, a cylinder, or any other indefinite shape. Among them, from the viewpoint of stable and efficient production of carbon clusters by arc discharge, etc., a long body (rod) is preferable, in which the cross section of the tip is extended from the tip of the discharge by evaporation of the carbon material. The term "single material" does not mean an aggregate of many fine materials such as chips (crushed materials, etc.), but rather a material that has been molded (shaped) into the desired shape for the production of carbon clusters.

The molding material of the present invention may be manufactured by graphitizing and then further processed by cutting or other means to make the desired shape suitable for electrodes.

In the molding material of the present invention, carbon clusters are not particularly limited, and include, for example, fullerenes such as C60, C70, and higher-order fullerenes, carbon nanotubes, and compounds in which metals or metal compounds are encapsulated or attached to them.

The biomass used in the molding material of the present invention is an organic resource of renewable biological origin, excluding fossil resources. In particular, plant-derived biomass is used as an essential one (e.g., non-patent document 3). Plant-derived biomass is not limited to, but includes, for example, woody materials, herbaceous species, agricultural crops, kitchen waste, seaweed, etc., resulting from photosynthesis. Such biomass is composed mainly of cellulose, hemicellulose, and lignin. Such biomass is a sustainable and ecological raw material, and forestry-based resources, agricultural resources, and waste-based resources are suitable for use.

The woody materials include, for example, trees, dead leaves and their wastes such as forest residues, pruning and leaf cutting materials, driftwood, and paper. Among woody materials, forestry resources include, for example, lumber, bark, lumber ends, thinned wood, pruned wood, and root wood. Small wood pellets made by compressing and molding lumber by-products, fungus beds for cultivating mushrooms and other plants using wood substrates as a medium, charcoal made by carbonizing wood materials, or semi-carbonized solids may be used as raw materials.

The herbaceous species include, for example, kenaf and sunflower stems.

The agricultural crops include, for example, palm, barberry stalk, sesame stalk, potato stalk, rice husk, sugarcane, sugar beet, corn, wheat, rice and other grasses. From the viewpoint of effective utilization of agricultural resources, these inedible parts are suitable for use.

The kitchen waste includes, for example, coffee grounds, tea shells, and okara (soy pulp).

In the present invention, "biomass as the main raw material" means that the content of biomass or biomass-derived raw material, excluding the binder in the precursor, is preferably 50 mass % or more, more preferably 60% or more, more preferably 70% or more, especially preferably 80% or more, and especially preferably 90% or more of the total raw material of the molding material in the process of calcination and graphitization of the precursor as described below. In other words, "biomass as main raw material" means that the biomass content in the precursor is preferably more than 60 mass %, more preferably more than 65 mass %, relative to the total amount of biomass and binder.

For example, the raw materials other than biomass and binders in the precursor include carbon materials derived from petroleum and coal, such as coal, coke, and carbon black, which are aggregates as well as biomass.

The bulk specific gravity of the molding material is not limited, but 0.8 to 2 $g/cm^3$ is preferable. When the bulk specific gravity is in the above range, the following advantages are provided.

(1) The molding material becomes dense, and cracking and disintegration are suppressed, making it suitable for manufacturing carbon clusters by fixing the molding material as electrodes, etc.
(2) The amount of material per unit volume is increased, and the manufacturing efficiency of carbon clusters can be improved.
(3) It has good spelling resistance, which can prevent cracks from occurring and damage to the molding material due to thermal shock during discharge.

From these perspectives, a bulk specific gravity of 0.8 to 1.8 $g/cm^3$ is more preferable, and 1.0 to 1.8 $g/cm^3$ is even more preferable.

The electrical resistivity of the molding material is not limited, but 100 $\mu\Omega m$ or less is preferable. With the electrical resistivity in this range, current can flow efficiently and carbon clusters can be produced more efficiently. The lower limit is not particularly limited. From the viewpoint of being suitable for the heat generation required for arc discharge and efficient evaporation of carbon materials used as electrodes, it is preferable that the electrical resistivity is equal to or higher than 8 $\mu\Omega m$.

The ash content in the molding material before graphitization, i.e., in the precursor above, is not limited, but is preferably equal to or less than 15% by mass. When the ash content is in this range, cracking and decrease in bulk specific gravity of the molding material can be suppressed. The lower limit of the ash content is not particularly limited, but 0.1% by mass is preferable.

The molding material has a diffraction pattern by powder X-ray diffraction method with one peak between 26 and 27° of 2θ (θ is the Bragg angle). The value of the ⅓ width divided by the base of this peak is 0.68 or less. The lower limit of the ⅓ width divided by the base value of the peak is about 0.1 for efficient production of carbon clusters. The ⅓ width of the peak indicates the width of ⅓ height of the peak. If the value of ⅓ width of the peak divided by the base is in this range and has one distinct peak, carbon clusters can be produced in high yield. 2θ at 26-27° is the peak observed in those with graphite structure. Although this is not a limiting interpretation of the invention, if the peak is clear, the graphitization process is sufficiently advanced and carbon clusters can be produced in high yield. Even if there are other peaks other than 26-27° that overlap the 26-27° peak, if the 26-27° peak is more than twice as high as the other peaks, it can be regarded as one distinct peak.

The preferred embodiment of the molding material is graphitized, containing biomass and a binder as the derived raw material. The binder can be kneaded with biomass and other materials as aggregate to obtain a dense and strong molding material.

The binder is not limited to any particular component, but a component containing carbon and preferably further containing hydrogen and oxygen is suitable. The binder may be a single component or a combination of two or more components. The properties of the binder should be fluid at room temperature from the viewpoint of mixing with the aggregate and forming. The binder may also contain a liquid form that dissolves or disperses other binder components, such as water.

Some or all of the binders include sugars, fats, oils, natural resins (such as pine oil), naturally occurring organic materials such as polyamino acids, synthetic resins such as phenolic resins, pitches (such as petroleum pitch and coal tar pitch), glue, gelatin, etc.

Among these, sugars are preferred. Sugars are not particularly limited, but include, for example, monosaccharides, oligosaccharides (disaccharides, trisaccharides, etc.), polysaccharides (cellulose, starch, dextrin, etc.), molasses, etc. Sugars that are solid at room temperature may be mixed with water or other liquid materials that dissolve or disperse to form a binding agent.

2. Method for Manufacturing Molding Material for Producing Carbon Clusters

The method for manufacturing of the molding material for carbon cluster production (hereinafter referred to as the manufacturing method of the present invention) comprises the following steps (A), (B), and (C).

(A) obtaining a molded precursor containing a the calcined biomass and a binder
(B) optionally, further baking the precursor
(C) graphitizing the precursor at a temperature of 2500° C. or higher In the step (A), the provisionally calcined biomass is preferably calcined at a temperature below 1300° C. In particular, those calcined at 600-1300° C., among which 1000-1300° C. are preferred. The time for provisional firing varies depending on the raw material, but usually ranges from one hour to several days. The provisionally calcined material is mainly obtained by calcination in a non-oxidizing atmosphere. For example, a non-oxidizing atmosphere can be used by placing the biomass in a graphite box and burying the box in a coke breeze. In order to obtain a calcined body in step (A) or to bake the precursor in the step (B), the equipment configuration is not particularly limited, but can be performed using, for example, a conventionally known calcination furnace. By carrying out calcination in the steps (A) or baking in step (B) beforehand, volatiles of biomass and binders can be removed, and a dense and suitable raw material for the production of carbon clusters can be obtained.

The step of calcination to obtain a calcined material in the step (A) may be carried out using the biomass that has been powdered by grinding and molded by a press or other means for convenience. Such a molded biomass may be a wood pellet. the wood pellet is solid fuel made by molding wood material powder into a cylindrical shape. These are manufactured through a pulverization process in which wood materials such as wood chips and bark are pulverized, a drying process in which the pulverized wood powder is heated and dried, and a compaction process in which the dried wood powder is compressed and molded.

Otherwise, if the biomass obtained has been calcined at the above temperature in advance, such as charcoal, it may be provided as a provisionally calcined body directly to the next process.

When obtaining a molded precursor, the calcined material is mixed with a binding agent. When mixing with the binder, the provisionally calcined biomass should be ground to a powder. By making it powdery, a dense compact can be obtained, and when it is mixed with other aggregates such as coal having the same particle size, it can be mixed uniformly, thus improving the formability.

The biomass in the precursor has a fibrous length of preferably 10 mm or less, more preferably 3 mm or less. Adjusting the length of the fibrous material to such a range provides good formability and crushing strength.

The aggregate, such as biomass, and a binder with flowability are kneaded at an appropriate temperature. After impregnating and uniformly mixing the binder, the mixture can be molded by any molding method such as mold filling using a press or other equipment to obtain the precursor.

The details of the type of binding agent and other factors are explained in the previous section.

The content of the binder in the precursor is not particularly limited depending on the type of raw material and various manufacturing conditions in the molding material for carbon cluster production, but is preferably 15 to 50% by mass, and most preferably 30 to 42% by mass. Alternatively, the moisture content in the precursor is preferably 3 to 15 mass %, greater than 3.2 mass % and less than 12.6 mass %. The content of the binder or the amount of moisture in such a range is suitable for maintaining the shape during arcing or other processes by preventing the precursor from collapsing at the precursor stage or reducing the mechanical strength of the molding material.

As explained above, it is preferable that the ash content in the precursor is equal to or less than 15%.

After the step (A), the step (B), in which the precursor is further baked, can optionally be performed. The step (B) is preferably carried out at a temperature at which volatiles are removed and graphitization is sufficiently advanced in the step (C). The step (B) is performed in the same temperature range as the calcination in the step (A), but mainly in a non-oxidizing atmosphere.

In the step (C), the precursor is graphitized by heat-treating it at a temperature of 2500° C. or higher, preferably 2500-3000° C., for 1 to 24 hours. When graphitization is carried out, the equipment configuration is not particularly limited, but can be carried out using, for example, a conventionally known heat treatment furnace, electric furnace, or the like. The upper limit of the temperature for graphitization is not particularly limited, but considering power consumption and the point of smooth graphitization, 3000° C. or lower is preferable. The graphitization can be performed mainly in a non-oxidizing atmosphere.

The graphitized molding material obtained in this way may be machined as needed to form the desired shape.

The details of bulk specific gravity, electrical resistivity, and diffraction pattern by powder X-ray diffraction method of the molding material for carbon cluster production obtained by the manufacturing method of the present invention are as explained above.

According to the molding material for carbon cluster production and its production method described above, it can be used as a sustainable and ecological material by using plant-derived raw materials instead of conventional petroleum- or coal-derived raw materials. In addition, the high content of carbon clusters can be obtained at a high yield even with low power consumption, which improves the production volume and reduces costs. For example, as a naturally occurring raw material, it can be suitably used as a compounding ingredient in cosmetics.

EXAMPLE

The invention is described in more detail by means of examples below, but the invention is not limited to these examples.

As raw materials for making rods, which are molding materials for carbon cluster production, chips obtained from palm, fungus beds, and cypress-cedar mixtures, respectively, were packed in cylinders, pressurized, heated to 200° C., and then cooled to a solid size of 10 cm. Wood pellets (cedar-derived, manufactured by Tsuno Pellet Industry) which were made by pulverizing dried wood into fine powder and pressurizing to 6-8 mm in diameter and 3-40 mm in length, and binchotan (charcoal) were also used.

Each raw material was calcined under a non-oxidizing atmosphere of CO gas at 1200-1300° C. for 2 days, and then ground to a particle size of 1 mm or less.

The following binders of the composition shown in Table 1:
  refined white sugar
  cornstarch, and
  liquid dextrin (Maltfresh, 30% moisture content), and
  distilled water
were added to the calcined pellets and kneaded in a pressurizing kneader at 50-70° C. for 10 minutes. The resulting mixture was molded under 20 MPa of pressure using a mold-press machine to obtain the precursor.

The above precursors were buried in a coke breeze and baked for 2 days under a non-oxidizing atmosphere of 1200-1300° C. to obtain the baked material. The rods were then obtained by heat-treating the baked material under a non-oxidizing atmosphere of 2500-3000° C. for 3 hours. For rods made from a mixture of cypress and cedar, the rods were heat-treated at 1500-2000° C. after baking. Binchotan (charcoal) was directly crushed, mixed with binder, and molded without calcination, because it had already been heated to about 1000° C. in the manufacturing process. The parameters of before baking, after baking and rod were measured and shown in Tables 1 and 2.

The properties of the rods for carbon cluster production made with coke and pitch as a reference example were ash content of 0.1%, bulk specific gravity of 1.72, electrical resistivity of 8 μΩm, soot conversion efficiency of 34.1%, and C60+C70 content of about 7%.

The measurement and evaluation of each sample was performed under the following conditions.
(Bulk Specific Gravity)

The length of each side of the molding material was measured with calipers, and the volume was calculated from the average dimensions of each side. The bulk specific gravity was calculated by dividing the weight by the volume.
(Electrical Resistivity)

Measured by the Kelvin double bridge method as specified in JIS R 7222.
(Method of X-Ray Diffraction Measurement)

The diffraction patterns were obtained by powder X-ray diffraction method (equipment name: MiniFlex II, X-ray source: CuKα, output: 0.45 kW, step size: 0.02°). The degree of graphitization was determined by comparing the peaks between 26 and 27° of 2θ for each sample (○: one clear peak, x: no peak, or other peaks overlap and are not more than twice as intense as the other peaks).
(Ash Content Measurement Method)

The ash content was measured in accordance with JIS Z 7302-4. The raw material was crushed and 1 g of it was used as a sample. The sample was heated to 815° C.±10° C. in air, and the ash content was determined as the mass of residual ash expressed as a percentage of the sample weight.
(Arc Discharge)

The arc discharge was carried out by the following method.

A molding material made of carbon material was processed into a rectangular shape with a cross-section of 46 mm×46 mm, and synthesis was carried out by evaporating it in He gas by direct current arc discharge to obtain soot containing fullerenes. If the rod was broken, but possible, it was cut into a 24 mm×24 mm rectangular shape and arc discharged. Synthesis was carried out in a closed container with water-cooled walls. The distance between electrodes was controlled to keep the output constant and stable as the carbon material evaporated.

The filling pressure of He gas was set to 4 kPa and the distance between electrodes was controlled so that the power output was about 25.5 kW. The fullerene content in the obtained soot and the fullerene yield relative to the consumed carbon material were as shown in Table 2.

The amount of fullerene was determined by the following method. 100 mg of the obtained soot was weighed, extracted with toluene, and filtered. The amount of C60 and C70 in the filtrate was measured by high performance liquid chromatography (HPLC), and the C60 and C70 in the soot were calculated and shown in Table 1 (when the amount of C60 and C70 was more than 1%, it was considered ○).

The results of each of the above measurements and evaluations are shown in Table 1 and Table 2.

TABLE 1

| Type | Raw material | | Example Binchotan (charcoal) | Example Palm | Example | Example Woody pellets | Example | Comparative Example Fungus bed-derived | Comparative Example Mixture of cypress and cedar |
|---|---|---|---|---|---|---|---|---|---|
| | Binder type | | white sugar/ liquid dextrin | white sugar/corn starch/water | | white sugar/corn starch/water | | white sugar/corn starch/water | white sugar/ liquid dextrin |
| | No. | | A-1 | A-2 | A-3 | A-4 | A-5 | A-6 | A-7 |
| Before baking | Bulk specific gravity | | ND | 1.3 | | 1.17 | | 1.25 | 1.279 |
| | Appearance | | ND | Good | | Good | | Good | Good |
| After Baking. 1300° C. | Ash content | % | 5.7 | 14.2 | | 3.4 | | 31.2 | 14.9 |
| | Bulk specific gravity | | 1.06 | 0.88 | | 0.85 | | 0.85 | 0.865 |
| | Appearance | | Good | Good | | Good | | Good | Breeze adhesion |
| Mixture | Dried binchotan | | 64 | — | — | — | — | — | — |
| | Calcined wood pellets | Max grain 1 mm | — | — | — | 70 | 70 | — | — |
| | Calcined solids | Max grain 1 mm | — | 68 | 66 | — | — | 66 | 58 |
| | Binder content | Mass % | 36 | 32 | 34 | 30 | 30 | 34 | 42 |
| Binder composition | White sugar | Powder | 65 | 65.0 | 65.0 | 65.0 | 65.0 | 65 | 65.0 |
| | Corn starch | Powder | — | 3.5 | 3.5 | 3.5 | 3.5 | 3.5 | — |
| | Water | Liquid | — | 31.5 | 31.5 | 31.5 | 31.5 | 31.5 | — |
| | Liquid dextrin | Liquid | 35 | — | — | — | — | — | 35.0 |
| Moisture in the precursor | | Mass % | 3.8 | 10.1 | 10.7 | 9.5 | 9.5 | 10.7 | 4.4 |

—: No blending,
ND: Not determined

TABLE 2

| | | | Example | Example | Example | Example | Example | Comparative Example | Comparative Example |
|---|---|---|---|---|---|---|---|---|---|
| Type | Raw material | | Binchotan (charcoal) | Palm | | Woody pellets | | Fungus bed-derived | Mixture of cypress and cedar |
| | Binder type | | white sugar/ liquid dextrin | white sugar/corn starch/water | | white sugar/corn starch/water | | white sugar/ corn starch/ water | white sugar/ liquid dextrin |
| | No. | | A-1 | A-2 | A-3 | A-4 | A-5 | A-6 | A-7 |
| Rod properties | No. | | B-1 | B-2 | B-3 | B-4 | B-5 | B-6 | B-7 |
| | Ash content | % | 0.1 | 0.1 | 0.2 | 0.4 | 0.3 | 0.5 | 6.2 |
| | Bulk specific gravity | | 1.08 | 1.195 | 1.156 | 1.133 | 1.106 | 0.73 | 0.822 |
| | Electrical specific gravity | μ Ωm | 59.9 | 41.1 | 41.6 | 69.1 | 73.1 | 195 | 140 |
| | Rod weight | g | ND | 687 | 672 | 721 | 708 | Graphitization cracking Not measurable | 549 |
| | Graphitization | XRD | ? | ? | | ? | | ? | x |
| | Appearance | | Good | Good | | Good | | Large cracks | Good |
| Fullerene synthesis | Rod consumption weight | g | 370 | 519 | 501 | 471 | 574 | ND | ND |
| | Soot weight | g | 111 | 212 | 192 | 118 | 163 | ND | ND |
| | Soot conversion rate | % (soot weight ÷ rod consumption × 100) | 30% | 40.8% | 38.3% | 25.0% | 28.4% | ND | ND |
| | C60 + C70(HPLC) | % | about 7% | 5.7% | 5.3% | 7.3% | 4.6% | 0.60% | 0.2% |
| | Fullerene synthesis | | ? | ? | | ? | | x (※) | x |

—: No blending,
ND: Not determined

※ The result of arcing a small piece of rod

As shown in Table 2, the amount of fullerene in the soot produced by the rods made from the fungus bed and the mixture of cypress and cedar was equal to or less than 1%. In contrast, the amount of fullerene in the soot obtained from the rods made from palm, wood pellets, and binchotan (charcoal) was equal to more than 1%, confirming the tendency to produce fullerene more efficiently.

The electrical resistivity of the rods that efficiently produced fullerene (derived from palm, wood pellets, and binchotan) was equal to or less than 100 μΩm. In contrast, the electrical resistivity of the rods that could not produce fullerene efficiently (fungus bed, cypress, and cedar mixture) was over 100 μΩm.

Furthermore, the results of X-ray diffraction for each rod are shown in FIG. 1, and the ⅓ width divided by the base value of the measured peak is listed next to the raw material species.

The palm-derived rods and wood pellet-derived rods, which efficiently produced fullerenes, had one peak between 26 and 27° of 2θ originating from graphite, as well as the coke-derived rods, and the value of ⅓ width divided by the base of the peak was equal to or less than 0.68.

The binchotan (charcoal) without any treatment was confirmed to have no peak between 26 and 27° of 2θ. However, for the rods that were subjected to the calcination and baking (graphitization) heat treatment described above, X-ray diffraction results showed one peak between 26 and 27° of 2θ, and the value of ⅓ width divided by the base of the peak was equal to or less than 0.68.

In Table 2, the comparative example (No. A-7) where the raw material was a rod derived from a mixture of cypress and cedar, no peak indicating the degree of graphitization was found in the X-ray diffraction data. The failure of fullerene synthesis was not due to the type of raw material, but rather due to the low heat treatment temperature for graphitization, since the rods derived from cypress and cedar were heat treated at 1500-2000° C. after baking.

Although it depends on the manufacturing conditions such as raw material composition, it was confirmed that the ash content of the calcined material before making rods tends to be desirable to be equal to or less than 15 mass % from the viewpoint of preventing rod cracking.

In order to investigate the appropriate amount of binder in the precursors when making the precursors, the same composition of binder as in A-4 and A-5 was added to the calcined wood pellets to make the precursors. Although it depended on the raw material composition and other manufacturing conditions, it was found that the amount of binder, preferably 15-50 mass % and most preferably 30-42%, was desirable for fabricating molding material.

The appropriate amount of moisture in the precursor at this time was investigated, and it was found that an amount greater than 3.2 mass % and less than 12.6 mass % was preferable for the fabrication of the molding material, although it depended on the raw material composition and other manufacturing conditions.

The invention claimed is:

1. A method for producing a molding material for producing carbon clusters, comprising the following steps:
    obtaining a molded precursor containing a calcined biomass and a binder, the calcined biomass being a biomass from a renewable source;
    optionally, further baking the molded precursor; and
    graphitizing the molded precursor at a temperature of 2500° C. or higher, thereby obtaining the molding material,
    wherein biomass-derived material in the precursor is 50 mass % or more,
    wherein the method further comprises adding and adjusting the moisture content of a precursor before graphitization of the molding material to be greater than 3.2 mass % and less than 12.6 mass % of the total precursor,
    wherein the molding material is graphitized,
    wherein the molding material has an electrical resistivity that is equal to or less than 100 μΩm, and
    wherein the molding material has a diffraction pattern by a powder X-ray diffraction method with one peak between 2θ (θ is the Bragg angle) of 26 to 27°, and a value of ⅓ width divided by a base of the peak is equal to or less than 0.68.

2. The method for producing the molding material according to claim 1, wherein the calcined biomass is calcined at a temperature of 1300° C. or lower.

3. The method for producing the molding material according to claim 1, wherein the molding material has a bulk specific gravity of 0.8 to 2 g/cm$^3$.

4. The method for producing the molding material according to claim 1, wherein the molding material has an ash content before graphitization that is 15 mass % or less.

5. The method for producing the molding material according to claim 1, wherein the binder comprises sugars.

6. The method for producing the molding material according to claim 1, wherein the carbon clusters comprise fullerene.

* * * * *